United States Patent [19]
Arnone et al.

[11] Patent Number: 5,953,164
[45] Date of Patent: Sep. 14, 1999

[54] WIDE RANGE CYLINDRICAL MIRROR MOUNT WITH RADIAL CLAMP

[75] Inventors: David F. Arnone, Mountain View; Michael Brownell, Huntington Beach; Sherwin D. Cabatic, Santa Clara; Khiem Ba Do, Sunnyvale, all of Calif.

[73] Assignee: New Focus, Inc., Santa Clara, Calif.

[21] Appl. No.: 09/162,584

[22] Filed: Sep. 29, 1998

Related U.S. Application Data

[63] Continuation of application No. 08/878,466, Jun. 18, 1997, Pat. No. 5,847,885.

[51] Int. Cl.⁶ ..................................................... G02B 7/02
[52] U.S. Cl. ........................... 359/818; 359/822; 359/819
[58] Field of Search ................................... 359/818, 819, 359/822, 831, 838

[56] References Cited

U.S. PATENT DOCUMENTS

| | | | |
|---|---|---|---|
| 5,140,470 | 8/1992 | Luecke | 359/818 |
| 5,530,547 | 6/1996 | Arnold | 359/818 |
| 5,680,260 | 10/1997 | Farcella et al. | 359/819 |
| 5,694,257 | 12/1997 | Arnone et al. | 359/822 |

*Primary Examiner*—Loha Ben
*Attorney, Agent, or Firm*—Wilson Sonsini Goodrich & Rosati

[57] ABSTRACT

An improved optical mounting apparatus permits a single kinematically adjustable surface to be presented in either a horizontal or vertical orientation with respect to a support. A three point fastening system allows cylindrical optical elements of various sizes to be fastened to the kinematically adjustable surface in a horizontal orientation. The three point fastening system is removable so that when the kinematically adjustable surface is placed in a horizontal orientation transparent optical elements such as prisms can be fastened to the surface with an unobstructed optical path for a full 360° around the mounting surface. The apparatus for mounting optical elements comprises a support, base plate, a pivot member, two adjustable projections, a stage plate, and at least three removable fasteners. The base plate includes first and third opposing faces and a second face at right angles to the first and third faces. The base plate has on its first and second faces, respectively, a first and a second fastening member, for fastening the first and third opposing faces in a horizontal orientation or a vertical orientation with respect to the support. The pivot member extends from the third face of the base plate. The two adjustable projections extend from the third face of the base plate. The two adjustable projections are arcuately separated by an angle of approximately 90° with respect to the pivot member. The stage plate includes first and second opposing faces. The first face of the stage plate is spaced apart from the base plate by the pivot member and is arcuately disposed with respect to the base plate by the two adjustable projections. To lock the cylindrical optical elements of different diameters to the second face of the stage plate, at least three removable fasteners are provided.

8 Claims, 4 Drawing Sheets

5,953,164

WIDE RANGE CYLINDRICAL MIRROR MOUNT WITH RADIAL CLAMP

This application is a continuation of U.S. patent application Ser. No. 08/878,466, filed Jun. 18, 1997, entitled "Wide Range Cylindrical Mirror Mount With Radial Clamp", now U.S. Pat. No. 5,847,885, which is incorporated herein by reference in its entirety.

BACKGROUND OF THE INVENTION

1. Field of the Invention

The present invention relates generally to an apparatus for mounting multiple optical elements, such as mirrors, beam splitters, lenses, gratings, filters and the like. More particularly, the present invention relates to an optical mount which holds cylindrical and planar optical elements at angular offsets from either of two orthogonal orientations.

2. Description of Related Art

The use of adjustable mounting apparatus for supporting optical components, such as mirrors, beam splitters, lenses, gratings, and the like, is known. The use of adjustable mounting or clamping devices is a common technique in the field of experimental optics. Such mounts are used to position optical elements, such as mirrors, beam splitters, lenses and gratings, light sources and other optical devices. Since these devices do not conform to a standard set of dimensions, each may require its own mount. The requirements are further complicated by the fact that each optical element has to be positioned at a precise orientation and location to each other and to the optical bench.

Optical mounts comprise a pair of generally parallel plates, of which one of the plates is fixed to a surface or base and the other plate is adjustably suspended from the first plate. The second plate may be mounted using a "six-point suspension," where adjustment of the perpendicular distance between the plates at each of the three suspension points can provide for fine adjustments to the orientation of the second plate. The ability to perform minute adjustments, on the order of a few arc seconds, to the orientation of an optical element is particularly necessary, in applications such as interferometry, holography, and optical communication where precise collumnation of a laser beam(s) is necessary.

Typically, optical mounts incorporating a "six-point suspension" system are fabricated from metal, machined to close tolerances, and are thus expensive. Many such mounts are required in even the most elementary set-ups. Compounding the costs associated with precision optical set-ups is the fact that each mount typically requires an expensive adaptor to hold optical elements of different shapes and sizes.

Thus, there is a need for a optical mount that is inexpensive and capable of accommodating various shapes and sizes of optical elements. There is a further need for an optical mount which permits fine adjustments to the mounting surface such as those associated with a "six-point suspension."

SUMMARY OF THE INVENTION

An object of the invention is to provide an optic mount that can hold a wide range of shapes and sizes of optic elements, without the use of special adaptors or a dedicated seat.

Another object of the invention is to provide a single mount capable of presenting either a horizontal or vertical mounting surface for an optical element.

A further object of the invention is to provide a kinematic adjustment mechanism that can precisely adjust the mounting surface in either the horizontal, or the vertical orientation to facilitate the precise alignment of an optical set-up.

According to the present invention, an optical mounting apparatus is provided for mounting of a plurality of optical elements on a support. The apparatus includes: a block, a first fastener, a compressive member, a first pair of support members and a first pair of fasteners. The block includes a first and a second face which are joined along an edge. The first fastener is defined by the second face, and is aligned on a transverse axis parallel to the first face. The compressive member is defined to engage the first fastener and to move along the transverse axis from an open position displaced from the second face to a closed position next to the second face. The first pair of fasteners is defined by the first face. Each one of the first pair of fasteners is positioned on opposite sides of the transverse axis. The first pair of fasteners engages the first pair of support members to provide for a compressive clamping of a cylindrical optic element between the first pair of support members and the compressive member in the closed position.

According to another embodiment of the invention, an apparatus for adjustable mounting of a plurality of optical elements on a support is provided. The apparatus comprises a block, a first and second support attachment and a fastening system. The block includes a first, second, third and fourth face. The second face joins the first face along an edge. The third face is orthogonal to the first face and opposite the second face. The fourth face is parallel to the first face and joins the second and third faces. The first support attachment is defined by the third face to provide for fastening of the block to the support in a first orientation in which the first face is parallel to a longitudinal axis of the support. The second support attachment is defined by the fourth face and provides for fastening of the block to the support in a second orientation in which the first planar face is orthogonal to the longitudinal axis of the support. The fastening system provides for the attachment of an optical element to the first planar face of the block. The optic elements include cylindrical mirrors and beam splitters.

According to a further embodiment of the present invention, an optical mounting apparatus is provided which permits a single kinematically adjustable surface to be presented in either a horizontal or vertical orientation with respect to a support. A three point fastening system is disclosed which allows cylindrical optical elements of various sizes to be fastened to the kinematically adjustable surface in a horizontal orientation. The three point fastening system is removable so that when the kinematically adjustable surface is placed in a horizontal orientation transparent optical elements such as prisms can be fastened to the surface with an optical path which is unobstructed for the full 360° around the mounting surface.

The apparatus for mounting optical elements includes a support, base plate, a pivot member, two adjustable projections, a stage plate, and at least three removable fasteners. The base plate includes first and third opposing faces and a second face at right angles to the first and third faces. The base plate has on its first and second faces, respectively, a first and a second fastening member, for fastening the first and third opposing faces in a horizontal orientation or a vertical orientation with respect to the support. The pivot member extends from the third face of the base plate. The two adjustable projections extend from the third face of the base plate. The two adjustable projections are arcuately separated by an angle of approximately 90° with respect to the pivot member. The stage plate includes first and second opposing faces. The first face of the stage plate is spaced apart from the base plate by the pivot member and is arcuately disposed with respect to the base plate by the two adjustable projections. To lock the cylindrical optical elements of different diameters to the second face of the stage plate, at least three removable fasteners are provided.

DETAILED DESCRIPTION

The optical mount of this invention allows for mounting of optical elements on a kinematically adjustable surface, which can be oriented either horizontally or vertically with respect to a support surface. In the horizontal configuration, cylindrical optical elements of varying diameters are firmly attached to the kinematically adjustable face plate by a simple three-point fastener system. The fasteners can be repositioned to accommodate optics of varying diameters. In the horizontal configuration, optical elements of varying diameters and geometries can be fastened to the kinematically adjustable horizontal stage plate by either the three-point fastening system or by an adhesive. Thus, a versatile inexpensive optical mount is disclosed for holding optical elements of a variety of sizes and shapes. The optical elements which may be held include mirrors, prisms, beam splitters, gratings, etc.

Figure 2:
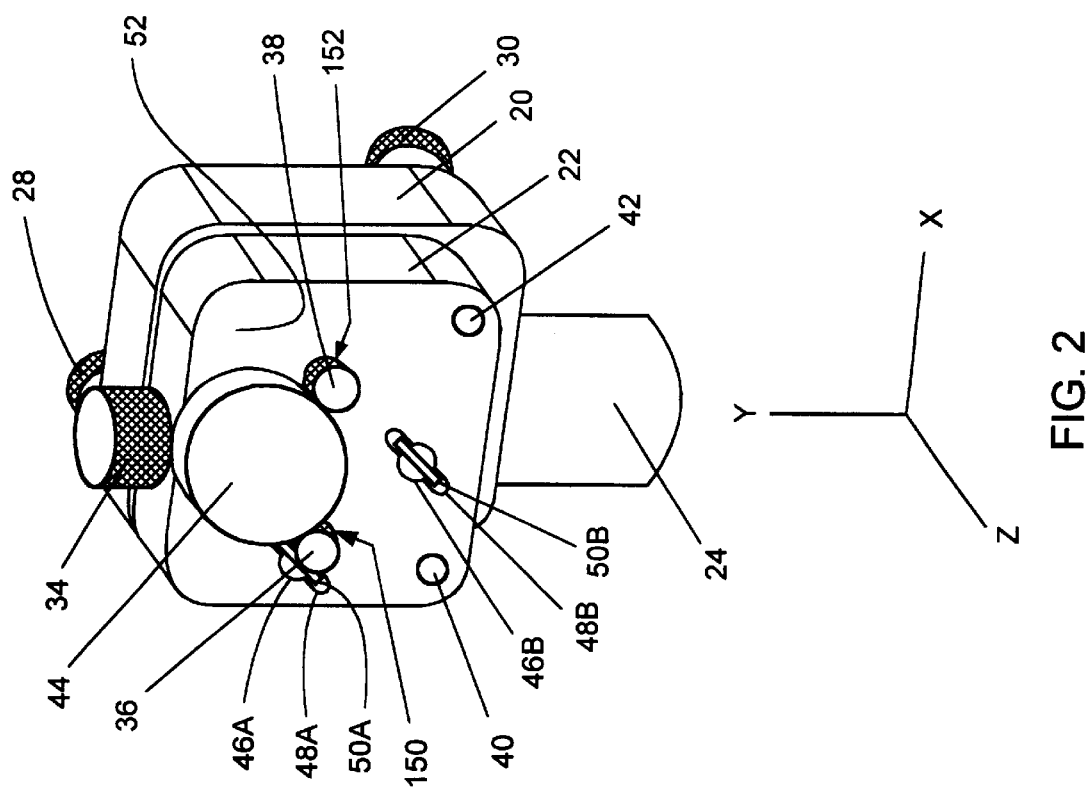
FIG. 2 is a perspective view of the optical mount positioned as a face mount and holding a small diameter optical element.
Figure 1:
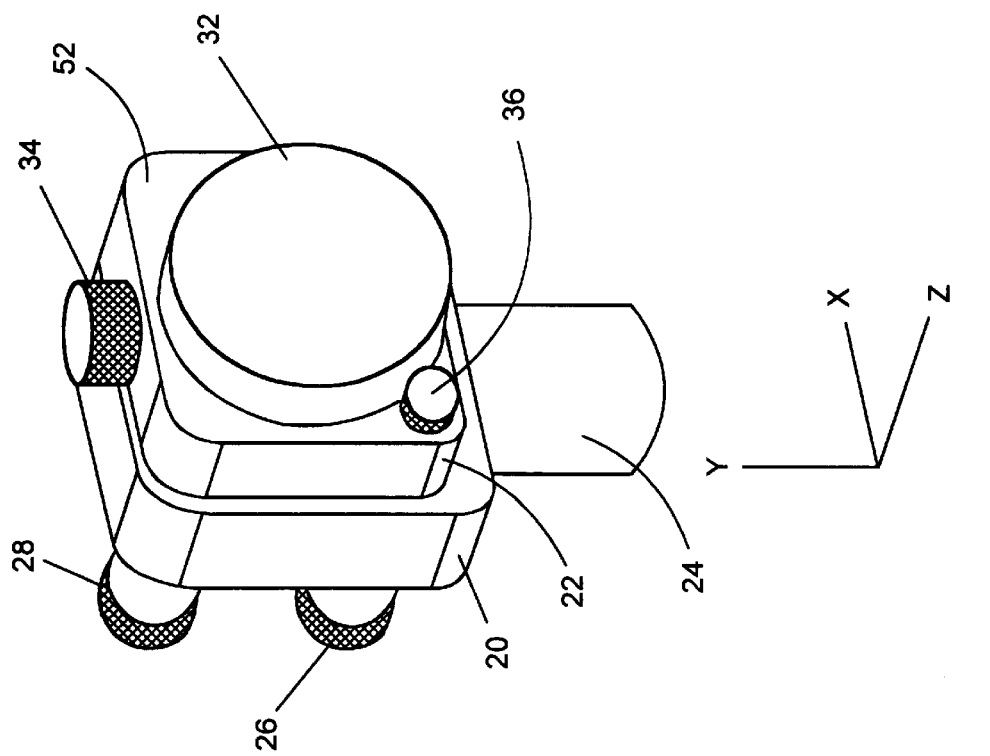
FIG. 1 is a perspective view of the optical mount positioned as a face mount and holding a larger diameter optical element.

FIGS. 1–2 are perspective views of the optical mount oriented to provide a kinematically adjustable surface which is vertically oriented in respect to X-Z groundplane. A large diameter optical element is shown mounted on the vertical surface in FIG. 1 and a small diameter optical element is shown mounted on the vertical surface in FIG. 2. As shown in FIGS. 1–2, the optical mount comprises base plate 20, stage plate 22, support column 24, kinematic adjustment screws 26, 28, 30, three-point fasteners 34, 36, 38 and stage-to-base plate tension assemblies of which the portions 46A–B, 48A–B, and 50A–B, are shown.

In FIG. 1, a specific embodiment is shown in a one-inch diameter optical element 32, e.g., a reflective mirror, is shown fastened to the exterior face 52 of stage plate 22. The optical mirror 32 rests on three-point fastener support pins 36 and 38 which screw into threaded holes 40 and 42 respectively, in stage plate 22. Holes 40 and 42 are positioned below the midpoint of optical element 32 and on either side of a vertical line running through the centerline of the thumbscrew 34. The holes may be symetrically or asymetrically displaced on either side of the centerline. The holes are positioned so that an optical element 32 can be clamped by the compressive action of thumbscrew 34. In an embodiment the holes are positioned so that an arcuate portion of an optic element will extend above the upper surface of stage plate 22, so that it can be clamped against support pins 36–38 by the thumbscrew 34. In an alternate embodiment, the thumbscrew 34 includes an assymetric washer with an extension that rides on face 52 and allows an optic which does not extend beyond the upper surface of stage plate to be compressively clamped by the thumbscrew and washer against support pins 36–38. In the embodiment shown in FIG. 1 the optical element is clamped against support pins 36 and 38 by the compressive action of thumbscrew 34, which is also threaded into the stage plate 22 along a longitudinal axis parallel to the plane of exterior face 52 of the stage plate. As the thumbscrew is moved toward the stage plate into the closed position, it compressively clamps the optic element.

As will be obvious to those skilled in the art, the three-point mounting system can be implemented on a solid block, a kinemetic mount, a rotational mount, or a translational mount. The plurality of hole pairs 40–42 and 150–152 in which support pins 36–38 can be mounted can be positioned anywhere on face 52 provided only that the support pins are positioned on either side of the longitudional axis of the thumbscrew 34. Other forms of three-point fasters can be utilized beyond the support pin and thumbscrew combination shown, without departing from the teaching of this invention. These other fasteners include: spring clips, snaps, deformable plugs, pins, arcuate clips, etc.

In FIG. 2, an alternate embodiment is shown in which a half-inch diameter optical element 44, e.g., a half-inch mirror is shown rigidly clamped to exterior face 52 of stage plate 22 by the three-point fastening system comprising screws 36 and 38 and thumbscrew 34. Screws 36 and 38 are in this embodiment shown threaded into a second set of holes 150 and 152 respectively, in the stage plate. These holes are also positioned below the midpoint of the half-inch optical element 44 and on either side of a vertical line running through the midpoint of that optical element. The holes are positioned above the first set of holes 40–42 so that an arcuate portion of the smaller diameter half-inch optical element 44 also extends above the upper-most surface of stage plate 22. Thumbscrew 34 asserts a radial force against optical element 44 and holds it in frictional contact with fasteners 36 and 38.

As further shown in FIGS. 1–2, stage plate 22 is elastically fastened to base plate 20 by means of tensioning members of which 46A–B, 48A–B and 50A–B are referenced. In this preferred embodiment, two springs are used to elastically bias the stage plate toward the base plate. The springs pass from the base plate through holes 46A and 46B in the stage plate where they are held in the extended position by retaining pins 50A–B positioned in recessed slots 48A–B. The recessed slots allow the spring to be anchored to the stage plate without breaking into the plane of the exterior face 52 of stage plate 22. It will be appreciated that other tensioning means may be used to draw the stage plate towards the base plate, including spring metal clips, magnets, and adhesively fastened resilient elastomers.

Counteracting the tensioning force of the springs which tends to draw the stage plate towards the base plate are kinematic adjustment members 26, 28, and 30. In this preferred embodiment, these adjustment members are shown as thumbscrews. As will be shown in greater detail in FIG. 4, these thumbscrews extend through threaded holes in the base plate to kinematic points of contact with the stage plate. Thumbscrew 26 allows for relative positioning along the Z axis of the stage plate with respect to the base plate. Thumbscrew 28 allows for arcuate movement about axis parallel to the X axis of the stage plate with respect to the base plate. Thumbscrew 30 allows are arcuate movement about axis parallel to the Y axis of the stage plate with respect to the base plate. Thus, another feature of the optic mount is that it provides a finely adjustable vertical mounting face suitable for fastening optical elements with the precision required for applications such as holography or interferometry.

Figure 3:
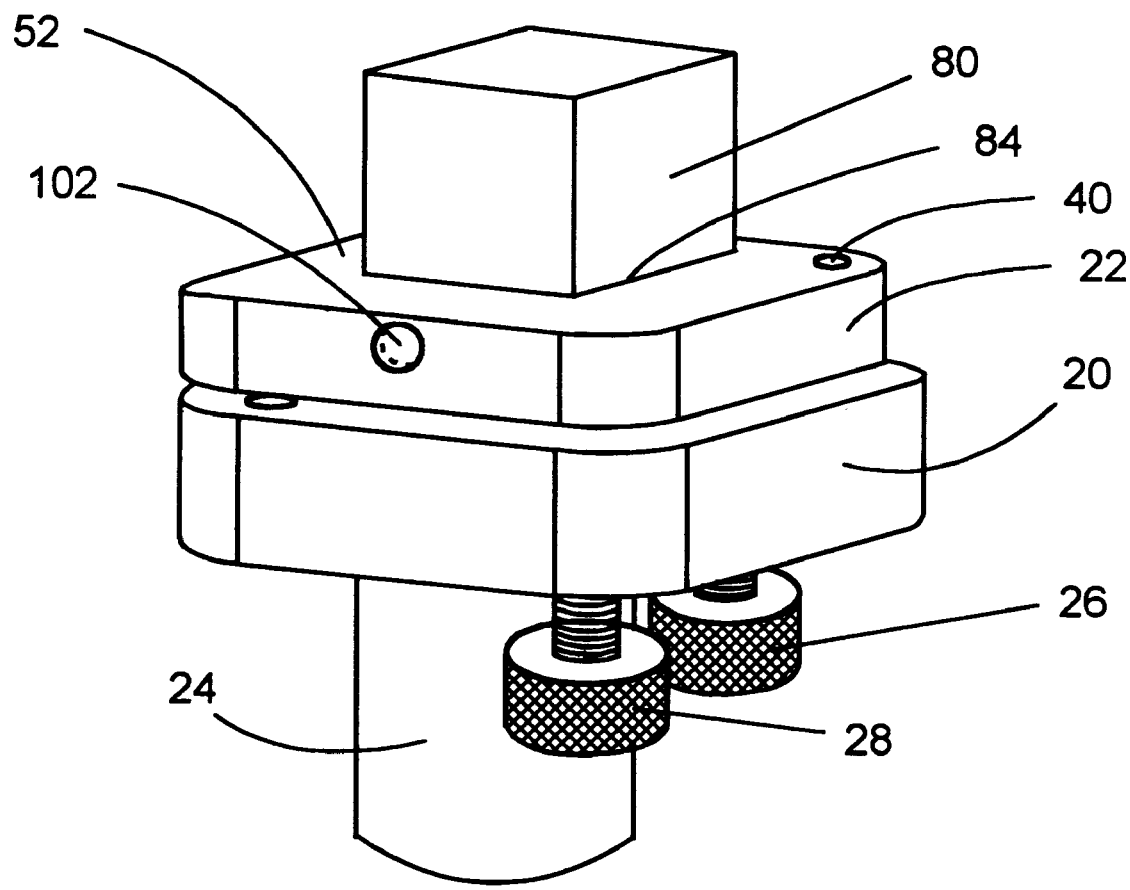
FIG. 3 is a perspective view of the optical mount positioned as a base mount and holding an optical element on the base.

A further feature of the optic element is shown in FIG. 3. The optic mount has been repositioned with respect to column 24 to provide a kinematically adjustable surface horizontal to the X-Z base plane for mounting an optic element. Column 24 has been fastened by means of a threaded member to the back side of base 20. Three-point fasteners 34, 36, 38, have been removed from threaded holes 102, 40, and 42, respectively. Thus, an unobstructed horizontal planar surface 52 is available for mounting an optic element. In this case the optic element shown is a prism 80 which is fastened to exterior face 52 by an adhesive strip 84. In this orientation, kinematic adjuster 26 allows for relative movement along the Y axis of stage plate 22 with respect to base plate 20. Kinematic element 28 allows for arcuate movement about axis parallel to the X axis of the stage plate with respect to the base plate. Kinematic adjuster 30, (not shown) allows for arcuate movement about the axis parallel to the Z axis of stage plate 22 with respect to base plate 20.

The fact that the three-point fastening system, when removed, presents a flat, i.e., planar surface is advantageous, in that it allows the same mount to be utilized for mounting a different class of optic elements. These include: i.e., prisms, corner cubes, beam splitters, etalons, detectors, light sources, gratings, etc. This is in contrast to the prior art approach in which surface 52 is aplanar, i.e., has a counterbore for compressively clamping cylindrical optic elements to the face. The aplanar prior art surfaces do not allow for the mounting optic elements such as prisms, corner cubes, detection sources etc. which require a flat, unobstructed mounting surface. The present invention provides such a flat mounting surface with an optically unobstructed path for a full 360° around the optic element. Thus, prisms, corner cubes, beam splitters can be mounted to face 52 in either the horizontal orientation shown in FIG. 3 or the vertical orientation shown in FIGS. 1–2.

Figure 4:
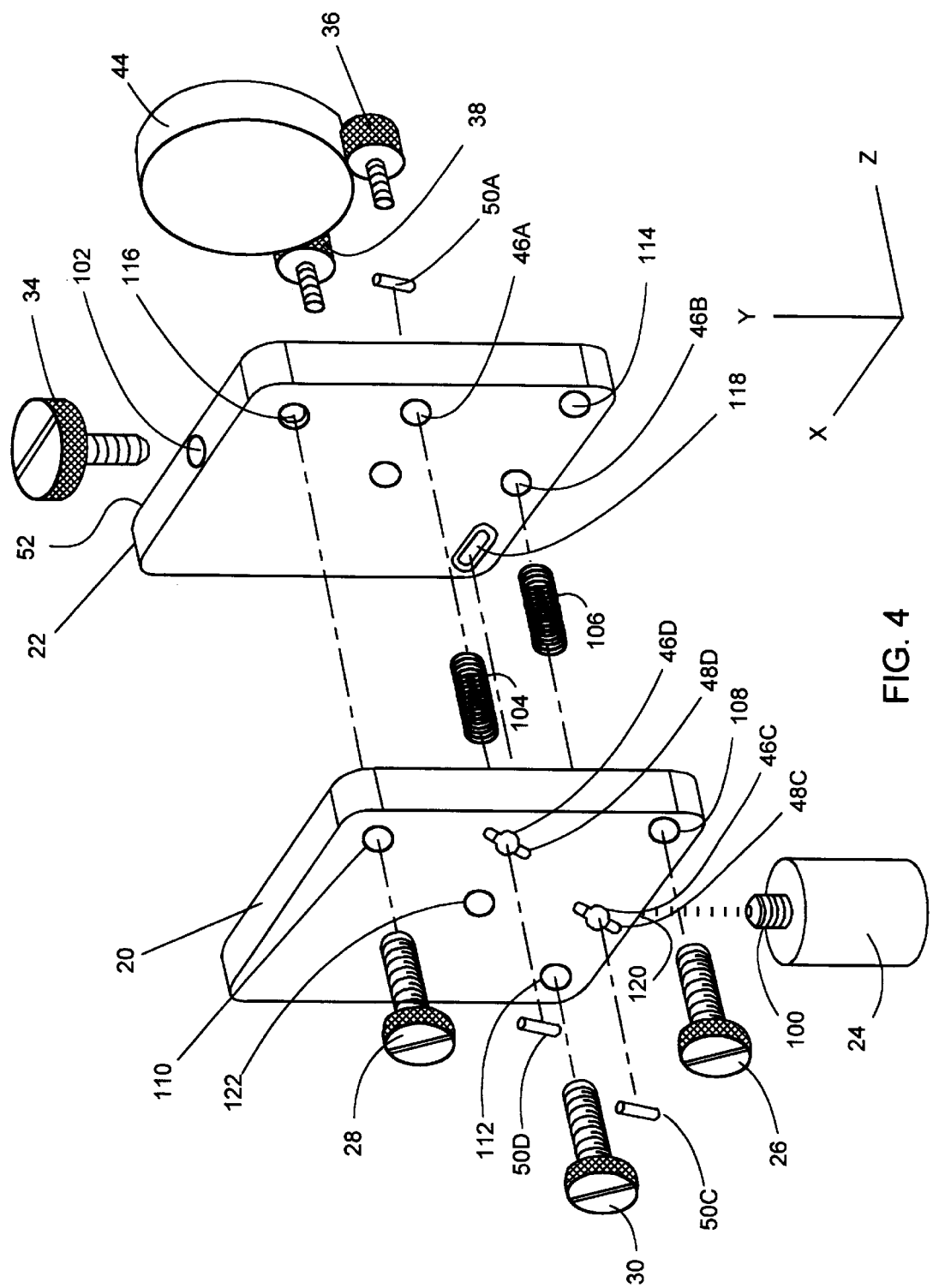
FIG. 4 is an exploded sectional view of the optical mount shown in FIG. 2.

FIG. 4 is an exploded isometric view of the optic mount in the orientation shown in FIG. 2. The components of the tension system, the kinematic adjustment system, the three-point fastener, and the column-to-base plate fastener are each shown.

The tensioner system comprises springs 104, 106; base plate holes 46C–D, and associated pin slots 48A–D; and retaining pins 50A–D. Stage plate 22 is held in tension against base plate 20 by means of both springs 104 and 106. Springs 104 and 106 have hooks on either end. The hooks on springs 104 and 106 allow those springs to be held below the plane of exterior face 52 of the stage plate by retaining pins 50A–B, respectively. The springs 104 and 106 are then drawn through holes 46D–C, respectively in base plate 20. The springs are stretched to the point where retaining pins 50D–C, can be inserted through the hooks in the ends of springs 104–106. The springs are then released and retaining pins 50B–C are drawn into pin slots 48D–C, respectively. The remaining tension on each of springs 104 and 106 provide the tensioning for drawing stage plate 22 toward base plate 20.

The kinematic adjustment assembly comprises kinematic adjustments screws 26–30, threaded base plates hole 108–112, and kinematic stage plate contact points 114–118. Kinematic adjustments screws 26, 28 and 30 have hemispherical tips. These screws are threaded through corresponding threaded base plate holes 108, 110, and 112 and contact, respectively, stage plate kinematic mounts 114, 116, and 118. The ball tip of kinematic adjustment screw 26 contact stage plate 22 at kinematic mount 114. Kinematic contact point 114 is a conically shaped detent which provides three points of contact with the tip of adjustment screw 26. In an alternate embodiment if no relative positioning along the Z axis of the stage plate is desired, a ball bearing may be substituted for thumbscrew 26. The ball bearing would rest in contact point 114 and contact the opposing interior face of base 20, thereby providing a pivot point for the two plates 20–22. The hemispherical tip of kinematic adjustment screw 28 contact stage plate 22 at a single point of contact provided by flat bottom detent 116. The hemispherical tip of kinematic adjustment screw 30 contacts stage plate 22 at two points of contact provided by V-shaped slotted detent 118 in stage plate 22. Thus, six points of contact are provided by the combination of thumbscrews 26–30 with kinematic contact points 114–118. This allows for the precise adjustment about the X, Y and Z axis of the stage plate with respect to the base plate.

The three-point fastening assembly discussed above is shown comprising base screws 36 and 38 and thumbscrew 34. The base screws 36 and 38 are threaded into the plurality of holes on the stage plate face 52. These holes are positioned to accommodate varying diameters of optic elements and to position an arcuate upper portion of each optic element above the plane of the upper surface of stage plate 22. The protrusion of the optic above the plane of the upper face of stage plate 22 allows for a thumbscrew 34 to radially clamp the optic against three-point fasteners 36 and 38.

Base 22 may be oriented in one of two orthogonal orientations with respect to column 24. Column 24 has a threaded tip 100 which when fastened to threaded hole 120 in base plate 20 provides a kinematically adjustable vertical surface for the mounting of optics of various diameters. Alternately, when column 24, and specifically threaded tip 100, is threaded into hole 122 on the back surface of base plate 20 then face 52 is oriented parallel to the longitudinal axis of column 24 and a kinematically adjustable horizontal surface is provided for mounting the optic element. When fasteners 34–38 are removed, an optic element mounted on the horizontal surface 52 is optically unobstructed by any objects above the plane of mounting surface 52, as shown in FIG. 3.

Figure 7:
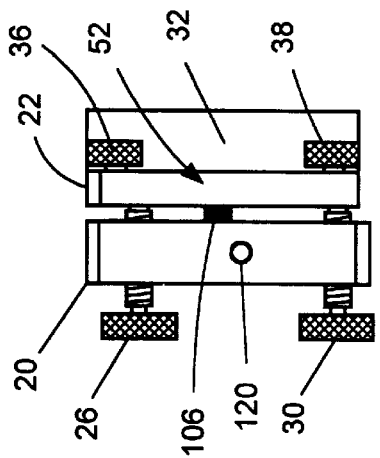
FIG. 7 is an item view of the optical mount taken along line 7—7 of the FIG. 5.
Figure 6:
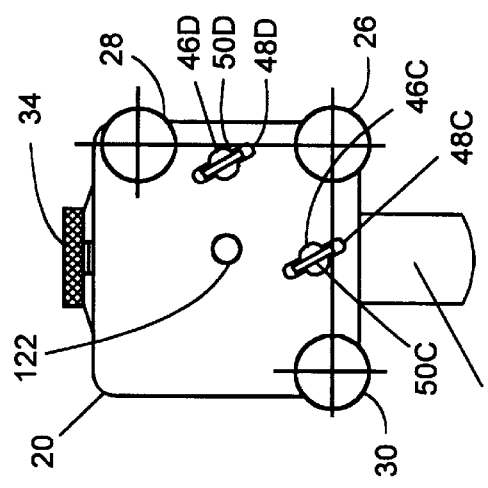
FIG. 6 is a back view of the optical mount.
Figure 8:
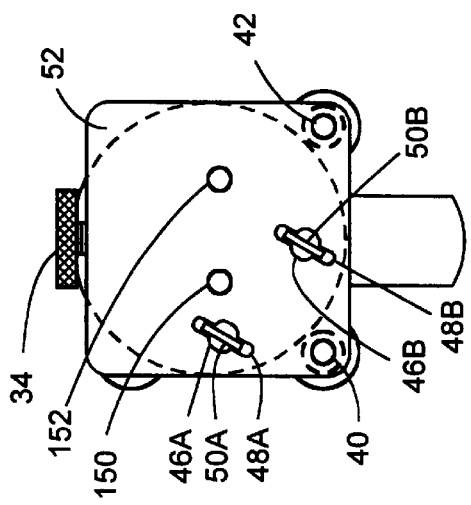
FIG. 8 is a front view of the optical mount.
Figure 5:
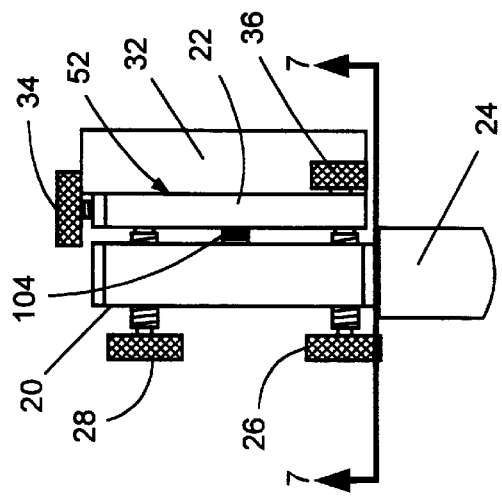
FIG. 5 is a side view of the optical mount.

FIGS. 5–8 show side, back, base and front views, respectively of the optic mount in a vertical mount orientation. FIG. 5 shows the one-inch diameter optical element 32 fastened to stage plate 22 by three-point fastening system comprising thumbscrews 34–38. The stage plate is drawn towards the base plate by springs, of which spring 104 is shown. The stage plate is arcuately positioned with respect to the base plate by means of kinematic adjustment screws of which 26–28 are referenced. The base plate is shown fastened to column 24. FIG. 6 shows a back view of the optic mount and the three kinematic adjustment screws 26–30. The mounting hole 122 for column 24 is shown. As discussed above, attachment of the column to this hole orients the mounting surface 52 of stage plate 22 horizontally. The portion of tension assembly comprising holes 46C–D, slots 48C–D, and retaining pins 50C–D is shown. FIG. 7 is a base view of the optic mount taken along line 7—7 in FIG. 5. The base mounting hole 120 for column 24 is shown. Attachment of the column to this hole orients mounting surface 52 of stage plate 22 vertically. Kinematic adjustment screws 26 and 30 are referenced. The lower thumbscrews 36 and 38 for attachment of the optic element to the stage plate are referenced. FIG. 8 is a front view of the optic mount. The threaded hole pairs 40–42 and 150–152 for the one-inch and half-inch optic elements are shown. The portion of the tension assembly comprising holes 46A–B, slots 48A–B, and retaining pins 50A–B is shown.

Although the foregoing invention has been described in detail for purposes of clarity of understanding, it will be obvious that certain modifications may be practiced within the scope of the appended claims.

What is claimed is:

1. An apparatus for mounting an optical element, said apparatus comprising:
    a block including a first planar face and a second face, and said second face joining said first planar face;
    a first fastening means aligned on an axis parallel to said first planar face;
    a compressive member defined to engage said first fastening means and to move along the axis from an open position displaced from the second face to a closed position proximate the second face;
    a first pair of support members;
    a first pair of fastening means defined by said first planar face and each one of said first pair of fastening means engaging a corresponding one of said first pair of support members to provide for a compressive clamping of the optical element between said first pair of support members and said compressive member in the closed position.

2. The apparatus of claim 1, further comprising:
    a second pair of fastening means defined by said first planar face and each one of said second pair of fastening means engaging a corresponding one of said first pair of support members to provide for a compressive clamping of a second optical element between said first pair of support members and said compressive member in the closed position.

3. The apparatus of claim 2, wherein:
    the first pair of fastening means includes:
        a first pair of apertures defined by said first planar face and each of the first pair of apertures orthogonal to said first planar face;
    the second pair of fastening means includes:
        a second pair of apertures defined by said first planar face and each of the second pair of apertures orthogonal to said first planar face; and
    the first pair of support members includes:
        a pair of fastening pins each frictionally retained within a corresponding one of the first and the second pairs of pair of apertures.

4. The apparatus of claim 3, wherein:
    each one of said first pair and said second pair of apertures comprise a threaded bore; and
    each one of said pair of fastening pins includes a thread suitable for rotatably engaging the threaded bore of a corresponding one of said first and said second pairs of apertures.

5. The apparatus of claim 1, wherein:
    the first fastening means defined by said second face, comprises a threaded bore; and
    the compressive member comprises a bolt including a thread suitable for rotatably engaging the threaded bore of said first fastening means.

6. The apparatus of claim 1, wherein:
    said block further comprises a third and a fourth face, and said third face orthogonal to said first planar face and opposite said second face, and said fourth face parallel to said first planar face and joining said second face and said third face;
    a first column attachment means defined by said third face, and said first column attachment means aligned to provide for the fastening of said block to a column in a first orientation in which said first planar face is parallel to a longitudinal axis of the column; and
    a second column attachment means defined by said fourth face, and said second column attachment means aligned to provide for the fastening of said block to the column in a second orientation in which said first planar face is orthogonal to the longitudinal axis of the column.

7. The apparatus of claim 6, wherein:
    said first column attachment means and said second column attachment means comprise respectively a first threaded bore and a second threaded bore.

8. The apparatus of claim 6, wherein:
    said first attachment axis of said first column attachment means intersects said second attachment axis of said second column attachment means.

* * * * *